United States Patent
Lingam et al.

(10) Patent No.: US 11,847,427 B2
(45) Date of Patent: Dec. 19, 2023

(54) LOAD STORE CIRCUIT WITH DEDICATED SINGLE OR DUAL BIT SHIFT CIRCUIT AND OPCODES FOR LOW POWER ACCELERATOR PROCESSOR

(71) Applicant: Texas Instruments Incorporated, Dallas, TX (US)

(72) Inventors: Srinivas Lingam, Dallas, TX (US); Seok-Jun Lee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 424 days.

(21) Appl. No.: 14/840,308

(22) Filed: Aug. 31, 2015

(65) Prior Publication Data

US 2017/0060586 A1  Mar. 2, 2017

(51) Int. Cl.
 *G06F 5/01* (2006.01)
 *G06F 9/30* (2018.01)

(52) U.S. Cl.
 CPC .......... *G06F 5/01* (2013.01); *G06F 9/30032* (2013.01); *Y02D 10/00* (2018.01)

(58) Field of Classification Search
 CPC .. G06F 9/30032; G06F 9/3877; G06F 15/763; G06F 15/7842; G06F 15/8053; G06F 5/01; Y02D 10/00
 See application file for complete search history.

(56) References Cited

U.S. PATENT DOCUMENTS

| | | |
|---|---|---|
| 5,045,993 A | 9/1991 | Murakami et al. |
| 5,119,483 A | 6/1992 | Madden et al. |
| 5,485,093 A | 1/1996 | Russell et al. |
| 5,638,312 A | 6/1997 | Simone |
| 5,734,575 A | 3/1998 | Snow et al. |
| 5,784,585 A | 7/1998 | Denman |
| 5,822,606 A | 10/1998 | Morton |
| 5,835,392 A | 11/1998 | Dulong et al. |
| 5,896,305 A | 4/1999 | Bosshart et al. |
| 5,903,155 A | 5/1999 | Björklund |
| 5,912,830 A | 6/1999 | Krech, Jr. et al. |
| 5,920,497 A | 7/1999 | Rim |
| 5,961,575 A * | 10/1999 | Hervin ................... G06F 5/015 708/209 |
| 5,978,838 A * | 11/1999 | Mohamed ........... G06F 9/30036 709/208 |
| 5,983,256 A | 11/1999 | Peleg et al. |

(Continued)

OTHER PUBLICATIONS

Intel, "IA-64 Application Developer's Architecture Guide", May 1999, pp. 7:154-7:158; C:16, 18-19, 23.*

(Continued)

*Primary Examiner* — David J. Huisman
(74) *Attorney, Agent, or Firm* — Brian D. Graham; Frank D. Cimino

(57) ABSTRACT

Described examples include integrated circuits such as microcontrollers with a low energy accelerator processor circuit or other application specific integrated processor circuit including a load store circuit operative to perform load and store operations associated with at least one register and a low gate count shift circuit to selectively shift the data of the register by only an integer number of bits less than the register data width without using a barrel shifter for low power operation to support vector operations for FFT or filtering functions.

15 Claims, 8 Drawing Sheets

(56) References Cited

U.S. PATENT DOCUMENTS

| | | | |
|---|---|---|---|
| 6,014,684 | A | 1/2000 | Hoffman |
| 6,233,597 | B1 | 5/2001 | Tanoue et al. |
| 6,317,820 | B1 | 11/2001 | Shiell et al. |
| 6,574,724 | B1 | 6/2003 | Hoyle et al. |
| 7,062,526 | B1 | 6/2006 | Hoyle |
| 7,136,265 | B2 | 11/2006 | Wong et al. |
| 7,236,338 | B2 | 6/2007 | Hale et al. |
| 7,281,117 | B2 * | 10/2007 | Tanaka ............ G06F 9/30014 712/226 |
| 7,386,326 | B2 | 6/2008 | Sundararajan et al. |
| 7,587,577 | B2 | 9/2009 | Royer et al. |
| 7,681,013 | B1 | 3/2010 | Trivedi et al. |
| 7,937,559 | B1 * | 5/2011 | Parameswar ....... G06F 9/30014 712/36 |
| 8,065,506 | B2 | 11/2011 | Xi et al. |
| 9,817,791 | B2 | 11/2017 | Lingam et al. |
| 9,952,865 | B2 | 4/2018 | Lingam et al. |
| 2001/0033469 | A1 | 10/2001 | Macbeth et al. |
| 2001/0037352 | A1 | 11/2001 | Hong |
| 2002/0156818 | A1 * | 10/2002 | Roche .................. G06F 7/768 708/200 |
| 2002/0198911 | A1 | 12/2002 | Blomgren et al. |
| 2003/0196072 | A1 | 10/2003 | Chinnakonda et al. |
| 2005/0005180 | A1 | 1/2005 | Webster |
| 2005/0044434 | A1 | 2/2005 | Kahle et al. |
| 2005/0144215 | A1 | 6/2005 | Simkins et al. |
| 2005/0251644 | A1 | 11/2005 | Maher |
| 2007/0083736 | A1 | 4/2007 | Baktha et al. |
| 2008/0071848 | A1 | 3/2008 | Baireddy |
| 2008/0133627 | A1 | 6/2008 | Langhammer et al. |
| 2008/0141012 | A1 | 6/2008 | Yehia et al. |
| 2008/0263285 | A1 | 10/2008 | Sharma et al. |
| 2008/0270771 | A1 | 10/2008 | Lee |
| 2009/0019262 | A1 | 1/2009 | Tashiro et al. |
| 2009/0063820 | A1 | 3/2009 | Xi et al. |
| 2009/0150654 | A1 | 6/2009 | Oberman et al. |
| 2009/0265409 | A1 | 10/2009 | Peleg et al. |
| 2010/0191979 | A1 | 7/2010 | Zipperer et al. |
| 2010/0211761 | A1 | 8/2010 | Dasgupta |
| 2010/0306292 | A1 | 12/2010 | Catherwood et al. |
| 2013/0061022 | A1 | 3/2013 | Lee |
| 2013/0145124 | A1 | 6/2013 | Qiu et al. |
| 2014/0280420 | A1 | 9/2014 | Khan |
| 2015/0058389 | A1 | 2/2015 | Blomgren et al. |
| 2015/0121043 | A1 | 4/2015 | Lee et al. |
| 2016/0291974 | A1 | 10/2016 | Lingam |
| 2016/0292127 | A1 | 10/2016 | Lingam |
| 2018/0018298 | A1 | 1/2018 | Lingam et al. |

OTHER PUBLICATIONS

Hewlett-Packard, "PA-RISC 2.0", 1995, pp. 2:18; 7:60, 62.*

"MSP Low-Power Microcontrollers", Texas Instruments, www.ti.com/msp, 2015, 41 pgs.

Plant et al., "MSP432 Microcontrollers: Bringing High Performance to Low-Power Applications", Texas Instruments, Mar. 2015, 11 pgs.

Texas Instruments, "The MSP430 Hardware Multiplier—Function and Applications", Application Report SLAA042, Apr. 1999 (34 pages).

SGS-Thomson Microelectronics, "D950-Core: 16-Bit Fixed Point Digital Signal Processor (DSP) Core", Sep. 4, 1997 (89 pages).

International Search Report and Written Opinion, PCT/US 2017/067030, dated Apr. 5, 2018, 7 pages.

Non-Final Office Action dated Sep. 10, 2021, U.S. Appl. No. 16/920,901, filed Jul. 6, 2020, 11 pages.

* cited by examiner

FIG. 7

| 0 | 1 2 3 4 5 6 | 7 8 9 10 11 | 12 | 13 14 15 | 16 17 18 19 | 20 | 21 | 22 | 23 24 25 | 26 27 28 | 29 30 31 |
|---|---|---|---|---|---|---|---|---|---|---|---|
| 0 | | | | | par_mpy_bfly_ls_ld | | | | | | |
| | ls : ldstA | | | m : mpy | | | | b : bfly | | | |
| | 00 | ld : ld_R | 0 | mpy_opn | 0 | | | bfly_opn | | | |
| | 0110 | ld_ARc | ld_R_rdx2 | 10 | mpyl_opn | 0 | op : bfly_op | s1 : mRc | s2 : mRc | d1 : mRc |
| | 0111 | st_A | 0 | nop | nop | | 000 | ADDC | i : t3u | i : t3u | i : t3u |
| | 010 | st_ovf_A | 1 | 11xxxx | | | 001 | SUBC | | | |
| | | add_ptrs | | | | | 010 | ADDH_SUBL | | | |
| | | nop | | | | | 011 | SUBH_ADDL | | | |
| | | 1xxxxxxxx | | | | | 100 | ADDL | | | |
| | | | | | | | 101 | SUBL | | | |
| | | | | | | | 110 | SHR_ADDSU | | | |
| | | | | | | | 111 | SHR_ADDSS | | | |
| | | | | | | | 11000 | | minmax | | |
| | | | | | | | 11001 | | minmax_sh | | |
| | | | | | | | 11010 | | cmpr | | |
| | | | | | | 10 | | pass | | | |
| | | | | | | | nop | | | | |
| | | | | | | | 111xxxxxxxxx | | | | |
| | 11100xxxxxxxxxxxxxxxx | | | | | | | | pass | | |
| | 11010xxxxxxxxxxxxxxxxxxxxxx | | | | | | | | cmpr | | |
| | 11011xxxxxxxxxxxxxxxxxxxxxx | | | | | | | | | lshift | |
| | 10000xxxxxxxxxxxxxxxxxx | | | | | | | | | rshift | |
| | 10001xxxxxxxxxx | | | | | | load_imm | | | | |
| | 101xxxxxxxxx | | | | | | load_zero | | | | |
| | 110000xxxxxxxxxx | | | | | | load_cnt | | | | |
| | 110001xxxxxxxxxx | | | | | | doloop | | | | |
| | | | | return | | | | | | | |
| | 11101xxxxxxxxxxxxxxxxxxxxxxxxxx | | | | | | | | | | |

| bits | 0-28 | 29 | 30 | 31 |
|---|---|---|---|---|
| 130 { 10101xxxxxxxxxxxxxxxxxxxxxxx | | | smr_lrshift | |
| | | 0 | lshift | |
| | | | sd : mSM | sf : shift factor |
| | | | e : eSM | e : eShift |
| | | | 0 sa0 | 0 one |
| | | | 1 ma | 1 two |
| | | 1 | rshift | |
| | | | sd : mSr | sf : shift_factor |
| | | | e : eSr | e : eShift |
| | | | 0 sr | 0 one |
| | | | 1 sr2 | 1 two |

| 1000xxx | | ld imm | | |
|---|---|---|---|---|
| | 00xxx | load_imm | | |
| | | d : mAguRegs | imm : word16 | |
| | | e : eAguRegs | | |
| | 01xxx | load Rimm | | |
| | | d : mR | imm : word16 | |
| | | mRr | | |
| | | 0   i : t3u | | |
| | | mRi | | |
| | | 1   i : t3u | | |
| | 10xxx | load zero | | |
| | | 0   d : mRc | 0000000000000000 | |
| | | i : t3u | | |
| | 11xxxxxx | load_cnt | | |
| | | imm : word16 | | |
| | | ls sp off | | |
| 1001xxx | 00xxx | load R sp idx imm | | |
| | | d : mR | 0000000000 | offs : t6u |
| | | mRr | | |
| | | mRi | | |
| | 01xxx | store R sp idx imm | | |
| | | s : mR | 0000000000 | offs : t6u |
| | | mRr | | |
| | | mRi | | |
| | 10xxxx | load_Rc_sp_idx_imm | | |
| | | d : mRc | 0000000000 | offs : t6u |
| | | i : t3u | | |
| | 11xxx | store Rc sp idx imm | | |
| | | s : mRc | 0000000000 | offs : t6u |
| | | i : t3u | | |
| 10100xxxxxxxxxxx | | add_imm_SP | | |
| | | offs : word16 | | |
| 1011xxx | | pc dcnt | | |
| | 00xxxxxxx | doloop | | |
| | | end : word16 | | |
| | | return | | |
| | | 01xxxxxxxxxxxxxxxxxxxxxxxxx | | |
| | | reti | | |
| | | 10xxxxxxxxxxxxxxxxxxxxxxxxx | | |

LOAD STORE CIRCUIT WITH DEDICATED SINGLE OR DUAL BIT SHIFT CIRCUIT AND OPCODES FOR LOW POWER ACCELERATOR PROCESSOR

CROSS-REFERENCE TO RELATED APPLICATIONS

The present application is related to U.S. patent application Ser. No. 14/678,944, filed Apr. 4, 2015 (and issued as U.S. Pat. No. 9,952,865) and entitled "LOW ENERGY ACCELERATOR PROCESSOR ARCHITECTURE WITH SHORT PARALLEL INSTRUCTION WORD AND NON-ORTHOGONAL REGISTER DATA FILE," and to U.S. patent application Ser. No. 14/678,939, filed Apr. 4, 2015 (and issued as U.S. Pat. No. 9,817,791) and entitled "LOW ENERGY ACCELERATOR PROCESSOR ARCHITECTURE WITH SHORT PARALLEL INSTRUCTION WORD," which applications are hereby incorporated by reference.

TECHNICAL FIELD

The present disclosure relates to electronic processor circuits and more particularly to microcontrollers and other integrated circuits.

BACKGROUND

Microcontroller units (MCUs) and other microprocessors are often used for battery powered user devices, for control systems to process data from sensors, or for other applications in which processing speed and low power consumption are important. Many applications involve analog signals received by a processor circuit as inputs from sensing devices, and mixed signal processors (MSPs) accordingly include embedded analog to digital converters and analog comparison functions combined with processor circuits. Example analog sensors include pressure, temperature, speed and rotation sensors, gyroscopes, accelerometers, optical sensors and the like. The analog circuitry receives analog input signals from a sensor and converts these to digital data for use in performing computations. Reduced power consumption in MCUs and MSPs can be achieved by executing various instructions in dedicated or specialized execution unit circuitry optimized for individual groups of instructions so that only a minimum number of gates have to toggle during the execution of a given instruction while other processor system data paths remain quiet. Some forms of specialized execution circuits are referred to as application specific instruction set processors (ASIPs) often used for signal conditioning algorithms. Moreover, certain signal conditioning computations can be made more efficient by intelligent address generation operations, such as for signal conditioning operations using vector computations (FFT, FIR filtering, IIR filtering, etc). However, simply limiting address generation operations for an ASIP to reduce power consumption can limit computational performance.

SUMMARY

In described examples, integrated circuits such as microcontroller units (MCUs) are disclosed with a low energy accelerator (LEA) processor circuit or other application specific integrated processor (ASIP) circuit. The examples include a load store circuit to perform load and store operations associated with at least one register, and a low gate count shift circuit to selectively shift the data of the register by only an integer number of bits less than the register data width. Example circuitry and corresponding instruction set architecture opcodes are described in which shift circuitry facilitates low-power address generation operations frequently used for vector operations associated with FFT or filtering functions as part of the load store unit in an ASIP, while providing support for a full set of address update mechanisms without significant overhead. Thus, while other solutions employ a full barrel shifter that supports arbitrary bit shifts throughout the entire register data width, disclosed examples avoid the usage of a full barrel shifter that is expensive in terms of gate count and energy consumption.

DESCRIPTION OF THE VIEWS OF THE DRAWINGS

FIG. 7 is a chart of an opcode encoding for an instruction set architecture (ISA) of the example microcontroller integrated circuit of FIGS. 1-6.

FIG. 8 is a table of additional shift circuit control details of the instruction set architecture arrangement in the example microcontroller integrated circuit of FIGS. 1-7.

DETAILED DESCRIPTION

Figure 1:
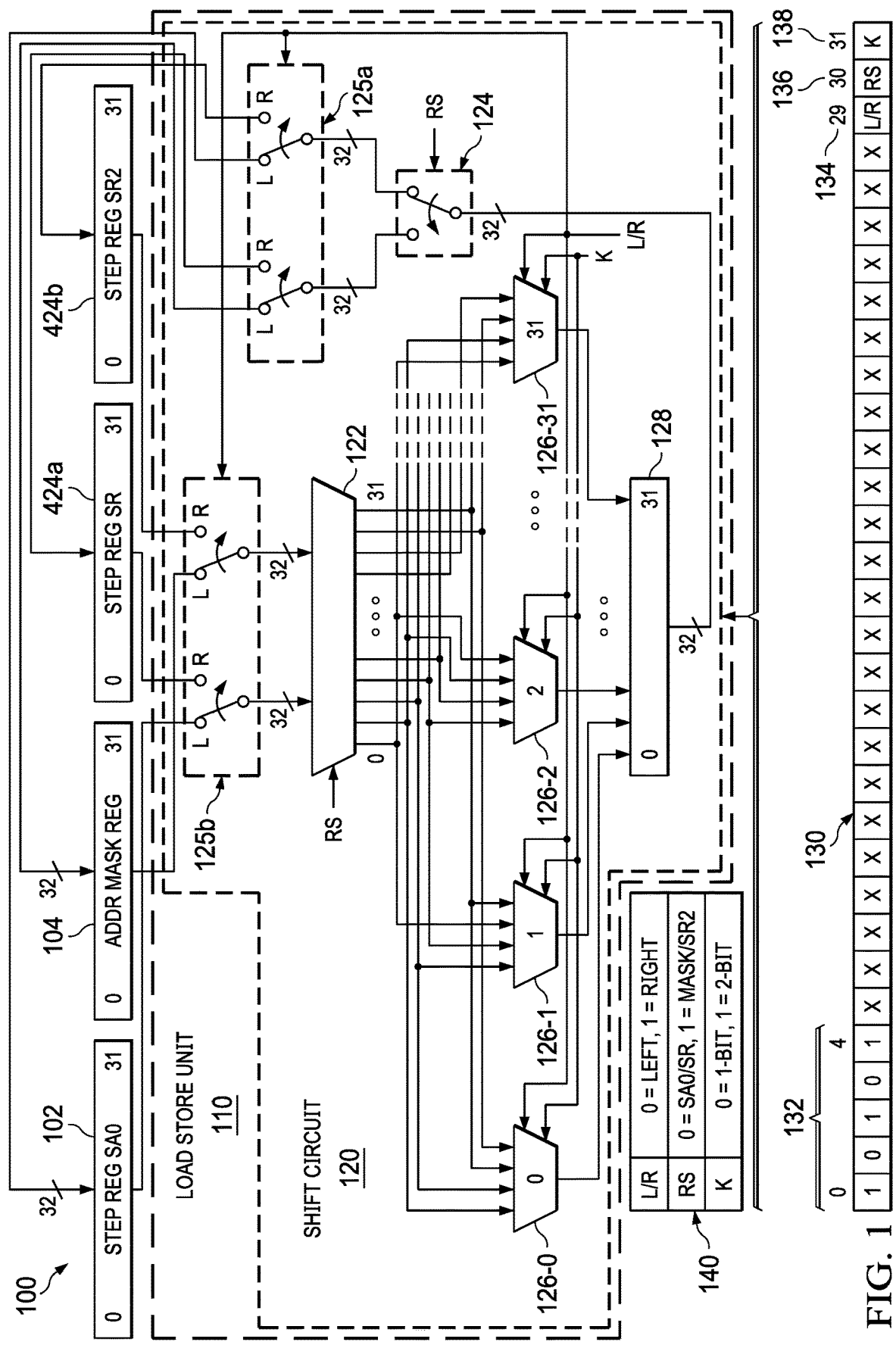
FIG. 1 is a schematic diagram of a dedicated single or dual bit shift circuit in a microcontroller integrated circuit.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . ." Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

Figure 2:
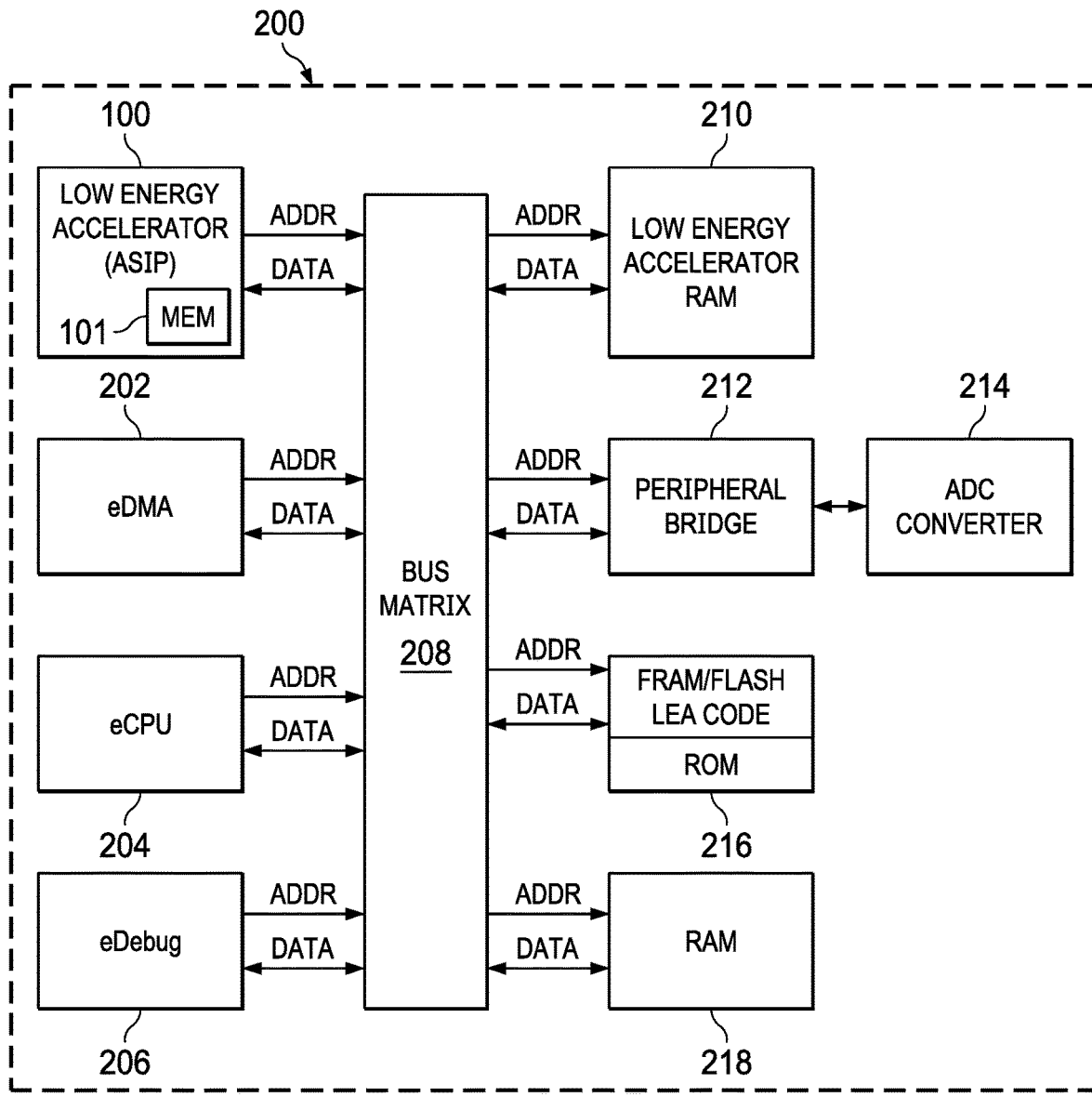
FIG. 2 is a schematic diagram of an example microcontroller integrated circuit including an example low energy accelerator processor.

FIGS. 1 and 2 show a microcontroller unit (MCU) 200 which can be a single integrated circuit (IC) 200 in one example. Certain example implementations include analog interface circuitry such as analog to digital converters, digital to analog converters, and associated signal conditioning circuitry, in which case the integrated circuit 200 can be referred to as a mixed signal processor (MSP). As best shown in FIG. 2, the integrated circuit 200 includes a bus matrix or system bus 208 along with a main or central processing unit (CPU) 204 and a low-energy accelerator processor (LEA) or other application specific integrated processor (ASIP) circuit 100 and associated memory 210. The CPU 204 is operatively coupled with the system bus 208 to perform general computing tasks, and the ASIP circuit 100 in one example operates to execute vector computation instructions 130 for filtering and FFT computations.

FIG. 1 shows one example shift circuit 120 constructed as part of the load store unit 110 in the ASIP circuit 100. The ASIP circuit 100 includes a load store unit or load store circuit 110 with a dedicated shift circuit 120 to perform load and store operations associated with at least one register 102 or 104 in the ASIP circuit 100. The shift circuit 120 in one example is operative according to a given vector computation instruction 130 to selectively shift data of a select one of a 32-bit step register 102 (labeled "SAO" in the drawing) and a 32-bit address mask register 104 (labeled "Addr MASK REG." in the drawing). In other examples, the shift circuit 120 can be dedicated to operate only in a single register of the ASIP circuit 100, or the shift circuit 120 can be selectively operated by suitable control signals to operate on a select one of a plurality of registers of the circuit 100. Unlike a full barrel shifter, the shift circuit 120 conserves power by only providing the capability of shifting the register data by an integer number L bits in a single operation. In general, the maximum shift amount L is less than an integer number J corresponding to the number of bits in the associated registers 102, 104, where J=32 in the illustrated example. The number of shifts L in a particular operation, moreover, is defined according to a shift amount operand 138 of the corresponding given vector computation instruction 130 associated with that operation. L is in a closed set S of positive integer numbers including a lowest value of 1 and a highest value of T, where T is less than J. In certain examples, L can be any positive integer number between and including 1 up to a maximum of T=J−1.

In this manner, the example shift circuit 120 is operative according to the given instruction 130 to selectively shift the data of the selected register 102 or 104 by only an integer number of bits less than the register data width without using a barrel shifter for low power operation to support vector operations for FFT or filtering functions. In the example of FIG. 1, T=2, and the shift circuit 120 is operative according to a given short parallel instruction word 130 to selectively shift the data of the register 102, 104 by only one bit or two bits, according to a single bit shift amount operand 138 of the instruction 130 (e.g., bit position 31 in FIG. 1).

As seen in FIG. 1, the example instruction 130 is a 32-bit short parallel instruction word including a 5-bit opcode 132 (e.g., 10101 in bit positions 0 through 4). The example instruction 130 further includes a single bit shift direction operand 134 (bit position 29 in one example) indicating whether a left or right shift is desired (direction indicated as LSHIFT or RSHIFT in FIG. 1). The shift circuit 120 is operative to selectively shift the data of the selected register 102 or 104 in either a first direction (L) or a second direction (R) according to the single bit shift direction operand 134. In other examples, separate opcodes can be used for left shift and right shift operations.

In addition, the example instruction 130 in FIG. 1 includes a source register operand 136 (e.g., "RS" in bit position 30) used in some examples to designate or select one of a plurality of registers of the ASIP circuit 100 for selective operation by the shift circuit 120. In the example of FIG. 1, the source register operand 136 is a single bit operand, and the shift circuit 120 selectively shifts the data of a first register 102 or a second register 104 according to the single bit source register operand 136 for left shift operations. In this example, moreover, a different set of two registers SR or SR2 424*a* or 424*b*, respectively, are used for right shift operations. The circuit in FIG. 1 includes switching circuits 125*a* and 125*b* to select which pair of registers are selectable for right or left shift operations according to the shift direction operand 134. In other examples, the shift circuit 120 may be used to selectively shift data of a selected one of more than two registers, for example, registers 102, 104, 418, 422, 424*a*, or 424*b* of the ASIP circuit 100 as described further below in connection with FIG. 4. In such examples, the source register operand 136 can be more than one bit, with the value encoded to designate a select one of a plurality of registers for shift operations by the circuit 120.

A table 140 in FIG. 1 shows example definitions and encodings of the operands 134, 136 and 138, with the single bit shift direction operand 134 (L/R) indicating a left shift for a bit value of 0 and a right shift for a bit value of 1. The source register operand (RS) in this example designates shifting of the first register 102 for a bit value of 0, and the mask register 104 is shifted for an operand bit value of 1. Also, the instruction 130 provides a single bit shift amount operand 138 (K) in which a bit value of 0 indicates a single bit shift operation, and an operand bit value of 1 indicates a dual bit shift operation.

The shift circuit 120 in FIG. 1 includes an encoder 122 or multiplexer receiving two sets of 32-bit input data from the selectable registers 102 and 104, respectively, and providing a single 32-bit output to a set of 32 4 to 1 multiplexers 126-0, 126-1, 126-2 . . . 126-31 each providing a single bit output to form a shifted 32-bit word 128 provided as an input through a 32 to 64 demultiplexer or switching circuit 124 to the input of the selected register 102 or 104. The 64 to 32 multiplexer 122 and the demultiplexer 124 are operated according to the source register operand bit RS such that the register 102 or the register 104 is selected for shifting operation. In addition, the 4 to 1 multiplexers 126 are operated according to the single bit shift direction operand 134 (L/R) and the single bit shift amount operand 138 (K).

In this manner, a selectable single or dual bit shift operation can be performed in either the left or right direction according to the operands 29 and 31, with the source register operand 136 determining which register 102, 104 is selectively shifted according to the given instruction word 130. As seen in FIG. 1, the shifting is implemented without a full barrel shifter, and thus the power consumption of the load store unit 110 is reduced. Furthermore, the provision of single operation dual or single bit shifting accommodates various vector operations for filtering and/or FFT computations, with the single or dual bit shifting being accomplished in a single clock cycle. Furthermore, additional shift amounts can be implemented by implementation of multiple instructions. For example, a 5-bit shift can be accomplished by executing a pair of dual bit instructions 130 (K=1) and a single bit instruction 130 (K=0). The shift circuit 120 is provided with a given instruction 130 and the ASIP circuit 100 includes suitable decoding circuitry as described further below in order to selectively actuate the shift circuit 121 a matching opcode 132 is present in a received instruction 130.

Although illustrated in the context of an MCU or MSP integrated circuit 200, the various concepts of the described examples can be used in any microcontroller or processor-based circuitry. The illustrated low energy accelerator processor example facilitates accelerating commonly performed vector operations with lower power consumption, and the use of dedicated limited range shift circuitry 120 facilitates power efficiency particularly compared to the use of full barrel shifters. The described examples are directed to LEAs dedicated to processing special instructions 130 to address signal conditioning operations using vector computations (FFT, FIR filtering, IIR filtering, etc). In these particular applications, single and dual-bit shift operations can accommodate a large majority of operations, and thus facilitate fast processing speeds via single cycle shifts in most cases, with the capability of implementing shifts of 3 or more bits using multiple instructions 130 executed by the ASIP/LEA circuit 100. For example, FFT (or inverse FFT) operations can employ recursive decomposition of discrete Fourier transform (DFT) techniques using various algorithms, such as a Radix-2 Decimation-in-Time (DIT) approach with 2-point DFT implemented using butterfly multiplier. The example shift circuitry 120 can be employed in certain applications for address offset register operations, thus allowing offsets to be divided by two or four, or multiplied by two or four by shifting a register containing offset data by 1 or 2 bits in either the left or right directions using appropriate instructions 130 having the shift opcode 132 and the appropriately set operands 134, 136 and 138.

In some examples, two specific instructions 130 can be used for left or right shifting, or a single instruction 130 can be used with an appropriate shift direction operand bit 134 as shown in FIG. 1. These examples use specific (fixed) 1-bit and 2-bit shift amounts less than the data width of the associated registers 102, 104. This described technique avoids the usage of a full barrel shifter that is expensive both in terms of gate count and energy consumption. These two example shift amounts are sufficient for nearly all the signal conditioning algorithms of interest in certain applications. At the same time, the described designs allow implementation of larger address updates using multiple instantiations of these instructions 130. Instructions 130 as described can be used for the basic operation of a 2 k pointer update of the load store circuit 110 without a full shifter for the low energy accelerator ASIP 100 with a short parallel instruction word (SPIW) instruction set architecture (ISA). The disclosed systems and instructions/operations enable low-energy and low gate count implementation of address pointer updates compared to the usage of an expensive full barrel shifter.

FIG. 2 shows a high level architecture of a microcontroller system 200 which can be arranged on a single integrated circuit as a "system on an integrated circuit" (SOIC), or which can be arranged in further alternative examples as a multiple chip module or circuit board. The bus matrix or system bus 208 couples various functional blocks or circuits to one another with the LEA processor 100 coupled to the bus matrix 208. The LEA (ASIP) 100 in one example includes a local memory 101 for instructions and/or data. The units and "functions" of the system 200 are embodied as circuits in certain examples, although referred to as units and/or functions and/or blocks hereinafter. As seen in FIG. 2, various additional embedded functional units are provided as part of system 200. An embedded central processor unit or circuit (eCPU) 204 is provided to perform general computing tasks and to support various input and output functions, memory accesses, data store and retrieval operations, and communications with external devices. An embedded direct memory access (eDMA) circuit 202 is coupled to the bus matrix 208 to access external memory such as DRAM or FLASH storage outside the system 200. A software debug module (eDebug) 206 is provided and coupled to the bus matrix 208 in one example.

The LEA circuit 100 in FIG. 2 has an associated memory 210 (LEA RAM labeled "Low Energy Accelerator RAM" in the drawing) also coupled to the system bus 208, for example, an embedded RAM such as static RAM (SRAM), ferroelectric RAM (FRAM), flash RAM and/or dynamic RAM (DRAM). The LEA circuit 100 uses the memory 210 for data storage and for storing intermediate results in one example. In certain examples, a dedicated LEA RAM 210 is omitted, and the RAM (218) and/or FRAM/Flash (216) is sufficient. Where the LEA RAM 210 is provided, the LEA 100 can still access and use the RAM (218) and/or FRAM (216).

A peripheral bridge unit 212 couples various additional peripheral units (not shown) to the bus matrix 208 and thus to the eCPU 204, and/or to the LEA circuit 100. Additional peripheral units such as bus interface units for test bus, scan bus, USB, and other bus interfaces can be coupled to the peripheral bridge 212. In addition, various application specific peripheral units such as analog to digital converters (ADC), digital to analog converters (DAC), embedded or external sensors such as gyroscopes, accelerometers, and position sensors can be coupled to the peripheral bridge 212. In the example of FIG. 2, an ADC converter 214 is operatively coupled with the system bus 208 via the peripheral bridge 212, and the ADC converter 214 can be constructed as part of the integrated circuit 200 in some examples. Radio and wireless communications functions such as WiFi, Bluetooth, NFC, and RF and cellular functions can be embedded as additional peripheral units with operative coupling to the peripheral bridge 212. The system 200 of FIG. 2 also includes non-volatile program storage 216, such as FRAM and/or FLASH memory for storing code for the LEA circuit 100. The storage circuit 216 in one example includes a portion of read only memory (ROM) for storing code used for boot-up or start-up program storage. Additional on-board memory 218 is provided in one example, which can be embedded RAM such as SRAM or DRAM (labeled as "RAM" in FIG. 2). The FRAM/ROM 216 and/or the RAM 218 can be considered a first memory coupled with the system bus 208, and the low energy accelerator RAM 210 is a second memory that can be used for ASIP instructions.

Figure 3:
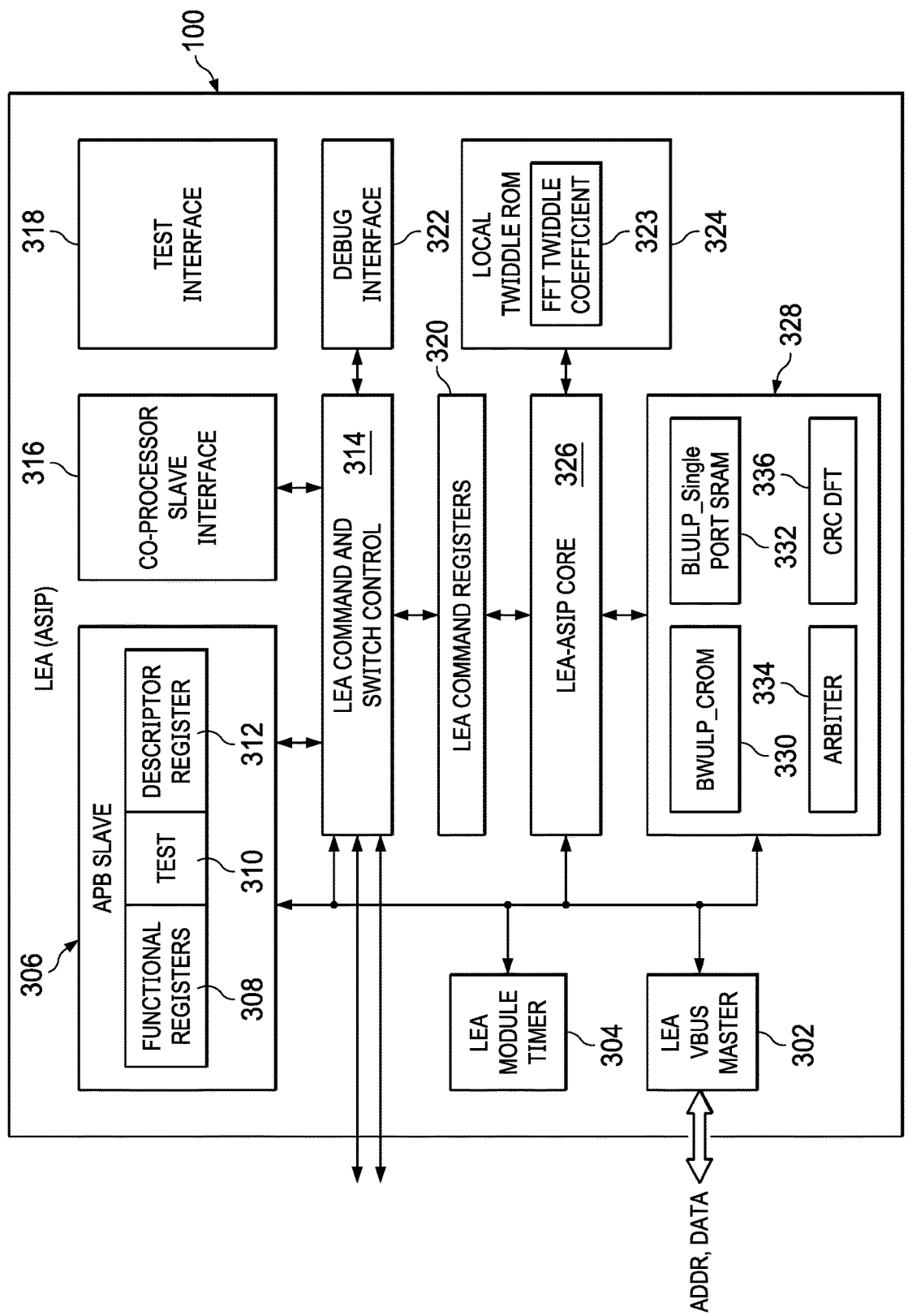
FIG. 3 is a schematic diagram of additional details of the low energy accelerator processor of the microcontroller of FIG. 2.

The LEA circuit 100 in one example provides a low power, high performance, programmable vector processing unit that can perform various vector computations independently from the eCPU 204. In this manner, the eCPU 204 can perform other typical computing tasks while the LEA 100 simultaneously performs vector computations required for certain applications, thereby providing a high performance vector accelerator or coprocessor for the system 200. The various functional blocks or circuits of the MCU system 200 can be provided, for example, as embedded functions implemented within a single integrated circuit. However, the arrangements of the present application are not limited to a single integrated circuit implementation, and various alternatives include implementing system 200 using multiple chips in a single package, stacked package modules, package on package modules, multi-chip modules, and circuit boards including memory chips, a CPU, and a LEA circuit 100 that can be fabricated as a standalone dedicated integrated circuit or as application specific integrated circuits (ASICs). The LEA circuit 100 can be provided, in one example arrangement, as a completely parameterized ASIP device core for embedding with other known and complete functional cores such as DSP, ARM, CPU, MPU, RISC and the like cores for use in an ASIC device.

a FIG. 3 shows details of an example of the functional circuits used to implement the LEA 100 in FIG. 2, and are referred to hereinafter as "blocks". A LEA command and switch control block 314 is coupled to a local bus. An additional peripheral block (APB) slave circuit 306 is coupled to the local bus and includes a set of functional registers 308, test functions 310 and a descriptor register 312. The APB slave circuit 306 provides an interface to additional peripheral devices on an advanced peripheral bus (APB). A LEA VBUS master circuit 302 provides an interface to the bus matrix 208 of FIG. 2. A LEA module timer 304 is coupled to a local bus. A set of LEA command registers 320 is coupled to a LEA-ASIP Core 326. The LEA-ASIP core 326 provides the computational core for the LEA circuit 100, and further details of the LEA core 326 are described further below in connection with FIG. 4. A co-processor slave interface 316 in FIG. 3 couples the LEA circuit 100 to the CPU circuit 204 of FIG. 2 and allows the LEA circuit 100 to act as a co-processor. The LEA command and switch control 314 can be exercised in one example either through the APB slave circuit 306 or through the co-processor slave interface 316. In some examples, the co-processor slave interface 316 is omitted or unused and the LEA command and switch control 314 is operated through the APB slave circuit 306. The blocks 318 (Test Interface), 322 (Debug Interface), 324 (Local Twiddle ROM including a FFT Twiddle Coefficient 323) in FIG. 3 provide additional interfaces and coefficient data storage for the LEA circuit 100. A block 328 provides a code ROM 330, a single port SRAM 332, an arbiter circuit 334, and a cyclic redundancy check (CRC) and DfT module 336 provide a "design for test" interface to enable self-testing and test operations. Instruction words for the LEA ASIP CORE circuit 326 in one example can be stored in a code ROM 330 (labeled BWULP_CROM in FIG. 3) and the single port SRAM 332 can be accessed by the LEA ASIP CORE 326 for retrieving instructions in some examples.

Figure 4:
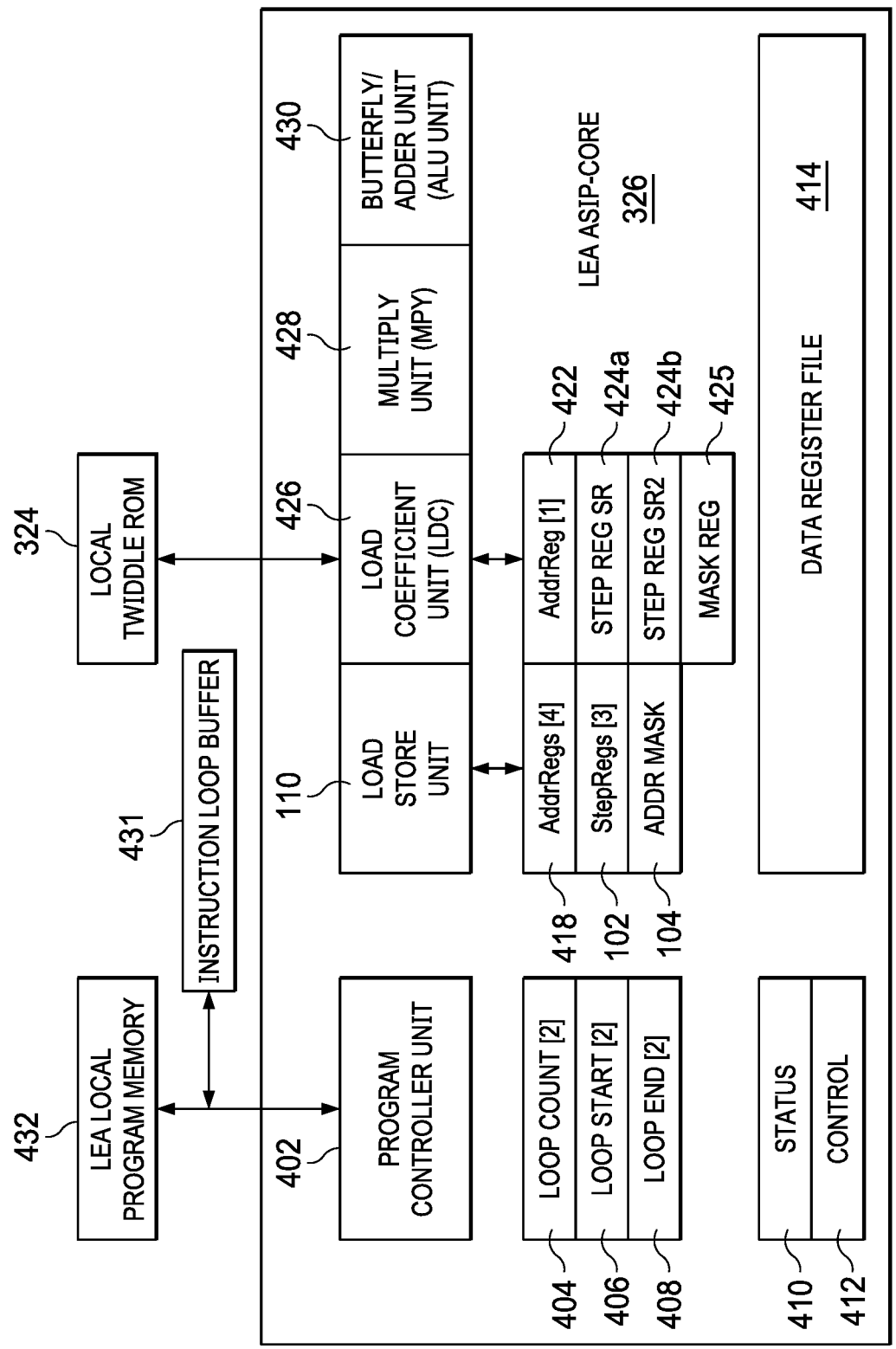
FIG. 4 is a detailed schematic diagram of a low energy accelerator core of the low energy accelerator processor of FIG. 3.

Referring also to FIG. 4, the LEA ASIP-Core circuit 326 provides a processor with four primary functional units 110, 426, 428 and 430, along with a program controller unit 402 to execute instructions in the form of parallel instruction words 130. In this example, a short parallel instruction word (SPIW) arrangement is used including short parallel instruction words 130 that are no wider than the width of the memory bus used in the system 200. This example reduces the driver devices needed between the instruction memory and the LEA ASIP-Core circuit 326. This reduces system bus power consumption while allowing a new instruction word to be fetched each cycle, without the need for widening the memory data path. In an alternative arrangement, the system bus can have a data word width that is half the length of the short parallel instruction word so that if the LEA circuit 100 is executing instructions from a memory located on the system bus, two memory accesses will be used to fetch an instruction word. In a further alternative, the instruction words 130 to be executed by the LEA processor can be stored in ROM or SRAM memory within the LEA circuit 100, in which case the local bus within the LEA circuit 100 can have a width equal to the length of the short parallel instruction word, enabling a new instruction to be fetched each clock cycle. The instruction set architecture or ISA for the LEA circuit 100 in one example is optimized for both vector computation efficiency and low energy. The instruction set architecture is arranged in one example so that the number of gates switching for certain operations is controlled to reduce the active power consumption of the LEA circuit 100. The LEA ASIP-Core 326 in FIG. 4 includes a pair of loop count registers 404, two loop start registers 406, and two loop end registers 408 and a program controller unit 402 to enable two simultaneous execution loops such as an inner do loop and an outer do loop. Status and control registers 410 and 412 provide additional resources for the program controller unit 402. The LEA core 326 in one example can fetch instruction words from a local memory (e.g., local memory 101 in FIG. 2), shown as a LEA local program memory 432 in FIG. 4, and loop execution is further supported by an instruction loop buffer 431.

The four execution units in FIG. 4 are the load store unit 110, a load coefficient unit (LDC) 426, the multiply unit 428, and the butterfly/adder unit 430, which is an arithmetic logic unit (ALU) arranged to efficiently compute vector operations such as the butterfly computation used in FFT, FIR, IIR and DCT vector operations. Additional resources provided in the example LEA ASIP-Core circuit 326 includes four separate address registers 418 coupled to the load store unit 110, three step registers 102, and an address mask register 104 are coupled to the load store unit 110. In addition, the load coefficient unit 426 is coupled to a separate address register 422, a set of step registers 424a and 424b (indicated as SR and SR2 in the drawing), a mask register 425, and the local twiddle ROM 324, for use in providing constants for certain computations. The shift circuit 120 in FIG. 1 executes instructions 130 to selectively shift data of a selected one registers 102, 104, 418, 422, 424a or 424b of the ASIP circuit 100. The four functional units 110, 426, 428 and 430 are each coupled to certain ones of a set of data registers in the data register file 414, but the four functional units are not each coupled to all of the registers in the data register file 414 in one example. In this implementation, an optimized design of the data register file 414 is used to tailor the physical connections needed between the various execution units and the registers in the data register file 414 so as to support the vector operations to be performed with the LEA ASIP-Core circuit 326 with a highly reduced gate count. The address registers 418, the step registers 102 for the load store unit, and the address register 422, and the step register 424, are also arranged separate from the data registers and are not connected to all of the execution units. In this manner, the number of connections between these address and step registers and the four execution units 110, 426, 428 and 430 is limited to the optimal connections needed to perform selected vector operations in one example, but is not fully orthogonal in that some of the execution units have no connections to these registers and resources.

Figure 5:
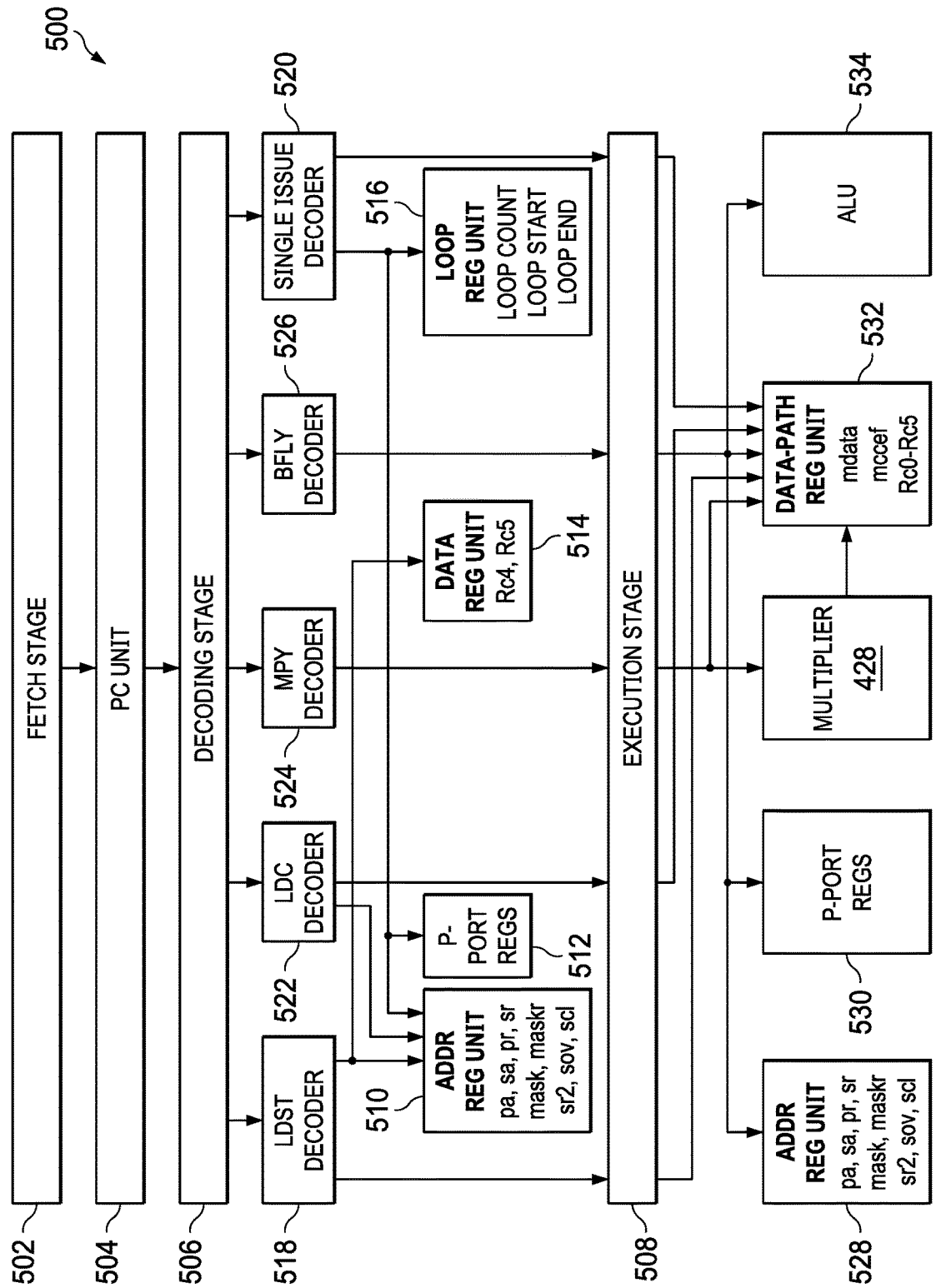
FIG. 5 is a program execution diagram of instruction execution stages for an example low energy accelerator processor circuit.

FIG. 5 illustrates an example program execution pipeline diagram 500 for the LEA processor circuit 100, which begins with an instruction fetch operation 502. The fetch operation is controlled by a program controller unit 504, and is followed by an instruction word decoding stage 506. During the decoding stage 506, the instruction word retrieved by the program controller unit 504 at the previous instruction fetch stage 502 is decoded by decoding units that correspond to the various execution units of the low energy accelerator core. For example, a load store decoder 518 (labeled "ldst decoder") decodes a portion of the instruction word that provides an op-code for the load store unit 110 (FIG. 4). A load coefficient decoder 522 (labeled "ldc decoder") decodes a portion of the instruction word at the decoding stage 506 that provides an op-code for the load coefficient unit 426 (FIG. 4). A decoder 524 (labeled "mpy decoder") decodes a portion of the instruction word at the decoding stage 506 that provides an op-code for the multiplier execution unit 428 (FIG. 4). A decoder 526 (labeled "bfly decoder") decodes another portion of the instruction word at the decoding stage 506 that provides an op-code for the butterfly/ADD execution unit (ALU 428 in FIG. 4). A decoder 520 (labeled "single issue decoder" in FIG. 5)

decodes a portion of the instruction word at the decoding stage 506 that corresponds to the looping and program counter functions supported by the program control unit. The decoding stage 506 provides decoded opcodes which are used to set up operations for execution by the LEA circuit 100 at an execution stage 508 by units such as an ADDR Reg. Unit 510, a peripheral port register unit 512, a data path register unit 514 and a loop register unit 516.

The execution stage 508 in FIG. 5 shows execution of the previously decoded instruction word by the execution units 110, 426, 428 and 430 of the LEA circuit 100, following the decoding stage 506. During the execution stage 508, the execution units of the LEA circuit 100 perform the indicated operations in parallel in one example according to the opcodes decoded from the instruction word at decoding stage 506. Because the LEA instruction execution is pipelined in this example, a new instruction word can be executed each cycle, where the fetch stage 502, the decoding stage 506, and the execution stage 508 each operate every machine cycle so that the LEA circuit 100 performs a new operation corresponding to a new instruction word 130 each cycle. The machine cycle can correspond to a single system clock cycle, in some arrangements. In other arrangements the machine cycle can correspond to a divided down clock cycle. At the execution stage 508, the decoded instruction word op-codes (e.g., opcode 132 in FIG. 1 above) control the operations performed by the LEA functional units (e.g., the shift circuit 120 of the load store circuit 110) and other hardware resources including, in the example of FIG. 4, address registers 528 (labeled "ADDR. Reg. Unit", a Peripheral Port Registers 530 (labeled "P-Port Regs"), a Multiplier 428, a DATA-PATH Reg. unit 532, and an ALU 534.

Figure 6:
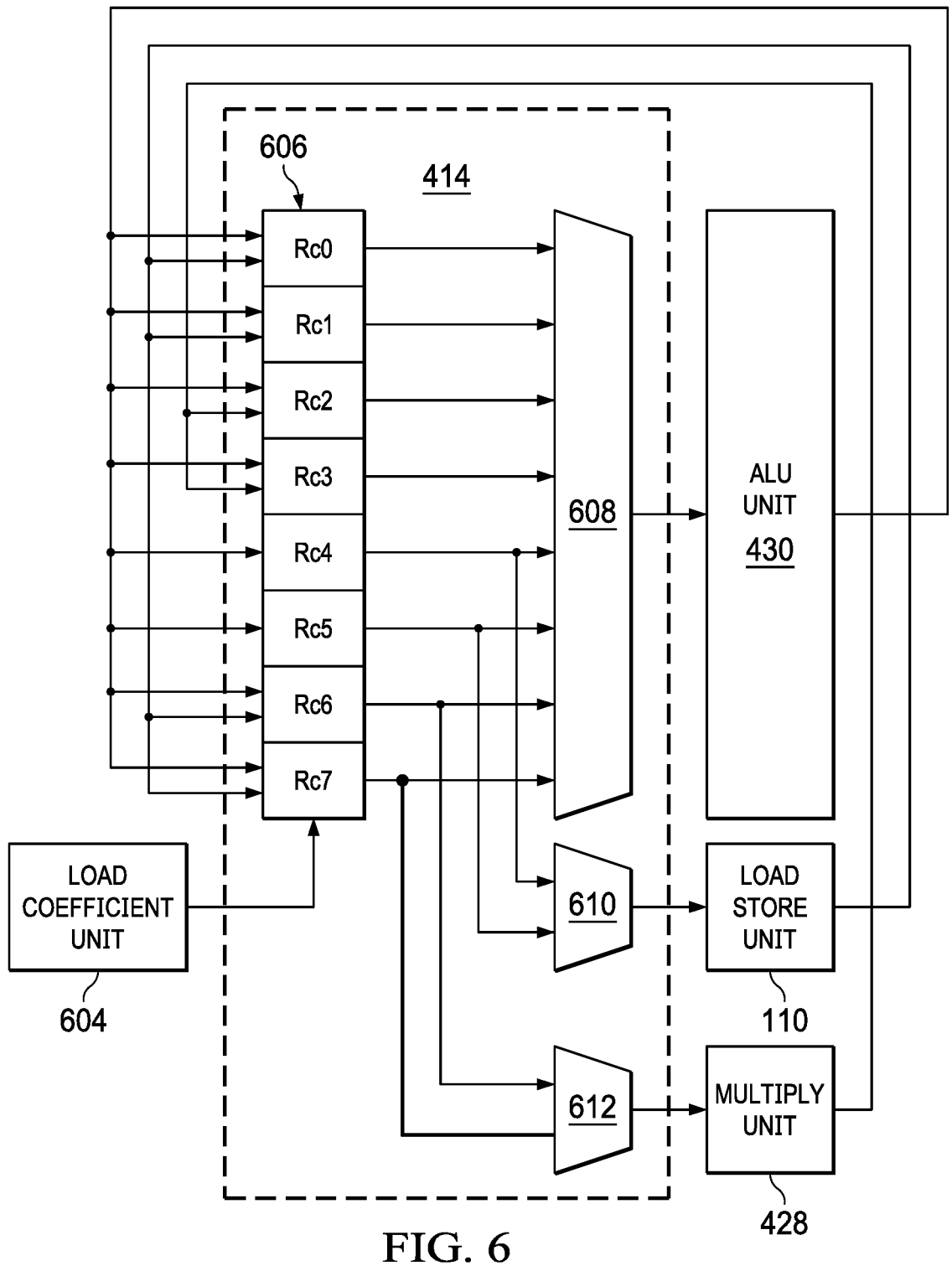
FIG. 6 is a schematic diagram of details of a data register file arrangement in the low energy accelerator processor circuit of FIGS. 2-4.

FIG. 6 illustrates an example arrangement for the data register file 414 of FIG. 4. Registers 606 are arranged as registers Rc0-Rc7. In one sample, the width of the data registers 606 is the same as an example system bus width (e.g., 32 bits). In another example, the system bus can be half of the length of the instruction words or 16 bits. In another example arrangement, the data registers 606 can be arranged in 16 registers of 16 bits each. In the example arrangement of FIG. 6, the load store unit 110 of the LEA processor core circuit 326 can access just two of the eight registers in the data register file 414 as source registers for load store operations, while the load store unit 110 can access four of the eight registers 606 as destination registers. In this example, a 2 to 1 multiplexer 610 couples registers Rc4, Rc5 to the load store unit 110. A load coefficient functional unit 604 (Load Coeff. Unit) of the LEA processor core circuit 326 can only access one of the registers (Rc7 in the example of FIG. 6) in the data register file 414. The multiply execution unit 428 can only access registers Rc6, Rc7 as source registers using a 2 to 1 multiplexer 612, and the Multiply Unit 428 has registers Rc2, Rc3 as destination registers. The ALU Unit 430 implements butterfly/ADD operations and other ALU operations, and is coupled to all eight of the registers Rc0-Rc7 by an 8 to 1 multiplexer 608. As shown in FIG. 6, the ALU 430 is coupled to all eight of the registers in register file 606 as destination registers. Thus the ALU 430 can access any of the registers in the register file 606.

FIG. 7 shows a combined opcode encoding chart 700 of an example instruction set architecture for the LEA ASIP circuit 100 for an example 32 bit instruction word width. Because the instruction word width is relatively short at 32 bits, the instruction word can be transmitted from a local memory store or a RAM, FRAM or FLASH location using the system data bus width and without the need for a wider bus, and thus without the need for additional driver devices and power to supply the drivers for a wider instruction word. In an alternative approach the system data bus width can be half the length of the short parallel instruction word, so that two memory accesses can provide an instruction word. Matching the instruction short parallel instruction word width to the memory bus width, or to twice the memory bus width, results in substantial reduction in the silicon area required and a corresponding reduction in power consumption. It also increases performance because a new instruction word can be fetched each memory cycle or for every two memory cycles. In an alternative arrangement, the system bus width could be 16 bits, while the short parallel instruction word 130 remains at 32 bits. If the LEA processor circuit 100 is retrieving instruction words from a memory (e.g., memory 216 in FIG. 2) coupled on the system bus (bus 208 in FIG. 2) in this arrangement, the instruction fetch would require two sequential accesses to memory over the system bus. However in additional arrangements the instruction words can be stored in RAM or flash or ROM memory positioned within the LEA processor circuit 100 (e.g., shown as local memory 101 in FIG. 2), for example, having a local bus of 32 bits in width, thereby enabling the LEA processor circuit 100 to retrieve new instruction words each clock cycle.

The instruction word example 700 in FIG. 7 has fields that correspond to the execution units of the LEA processor circuit 100, where the first bit is used to distinguish between "1 slot" and "4 slot" instructions. Bits 1-11 provide opcodes to the load-store execution unit. The column labeled "ls: ldstA" in FIG. 7 shows a summary of some of the operations for the load store unit are shown with their encoding. A single bit 12 in this example provides a control field for the load coefficient execution unit 426. In the column labeled "ld: ld_R," this bit is shown with encoding for certain operations. An opcode field for the multiplier unit 428 in this example is provided by bits 13-18, and in the column labeled "m: mpy," selected operations are shown for this functional unit with some example encoding. The remaining bits 19-31 of the instruction word provide the opcodes for controlling the operations of the butterfly/add ALU execution unit 430. In the column labeled "b :bfly," some selected operations for this execution unit 430 are shown with example encoding.

Additional "1 slot" operations are shown in FIG. 7, including "lshift," "rshift," "pass," "cmpr," "doloop," and "return" that are encoded in the bottom rows of table 700 when the first bit, bit 0, is a "1." In this example The LEA instruction set is tailored to fit in the 32 bit word length while providing a four slot, single issue instruction word so the load store unit 110, the load coefficient unit 426, the multiplier 428 and the butterfly/ADD ALU unit 430 can execute an operation for each LEA machine cycle. Further, the instruction set architecture in this example includes "1 slot" instructions that affect the program counter, stack pointer, load immediate or store with immediate operands, and register initializations. Although an example ISA arrangement is illustrated in FIG. 7, variations can be made to the example in order to form additional arrangements. For example, although bits 1-11 were chosen for the opcodes for the load store unit in the ISA shown in FIG. 7, another set of bits of similar length could be used instead, such as that's 21-31. More or fewer bits could be used for any one of the execution unit opcodes. The particular bits assigned to an execution unit can be modified to create additional alternative arrangements.

FIG. 8 shows a table 800 indicating a portion of the opcodes used to determine "1 slot" operations. The shift circuit 120 in FIG. 1 operates according to certain opcodes to selectively right shift data of a selected step register 102 (SAO) or an address mask register 104 associated with the load store unit 110 or to left shift a selected step register 424a (SR) or 424b (SR2) associated with the LDC 426 (see FIGS. 1 and 4 above). In this example, the shift amount is selected as 1 or 2 bits according to the K operand in bit position 31. The opcodes of FIG. 8 include operation of the shift circuit 120 of FIG. 1 via one or more instructions 130 having an example 5-bit opcode (e.g., 10101). The operand 134 (L/R) determines whether a right or left shift is to occur, and the operand 136 (RS) selects the specific register to be shifted. Other examples are possible, for instance, using a multi-bit operand RS 136 to select from more than two possible target registers for shifting either left or right. Also, multi-bit operands 138 (K) can be used in other examples for selective shifting by an integer number of bits L encoded by the operand 138 in a single operation for a vector computation instruction, wherein L is less than the bit-width J of the shifted register.

In the example of FIG. 8, when the first bit 0 is a "1", a "1 slot" operation is indicated. As shown in FIG. 8, these 1 slot operations include certain shift operations, load immediate or "ld_imm" operations, load or store operations with immediate operands such as "ls_sp_off", stack pointer update operations such as "add_imm_SP", and program controller (PC) operations such as "pc_dcnt" operations in one example. In this arrangement, moreover, the length of the short parallel instruction word 130 can be less than or equal to the width of the system bus. In an alternative arrangement, the short parallel instruction word 130 is 32 bits wide, for example, while the system bus is only 16 bits wide. In this arrangement, the instruction words would require two memory accesses if the instruction words are stored on a memory coupled to the system bus 208, however instruction words 130 for the LEA processor circuit 100 can be stored in local ROM, SRAM, FRAM and/or FLASH memory within the LEA processor circuit 100 (e.g., shown as local memory 101 in FIG. 2) and can be fetched in a single clock cycle.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims. In addition, although a particular feature of the disclosure may have been disclosed with respect to only one of multiple implementations, such feature may be combined with one or more other features of other embodiments as may be desired and advantageous for any given or particular application.

The following is claimed:

1. A data circuit, comprising:
a register;
a first switching circuit having a first input and an first output, wherein the first input of the first switching circuit is coupled to the register;
a multiplexer having a single bit shift direction operand input, a single bit shift amount operand input, and an output, wherein the single bit shift direction operand input is coupled to a switch control input of the first switching circuit, and wherein the single bit shift amount operand input is adapted to be coupled to an instruction operand;
a demultiplexer, wherein an input of the demultiplexer is coupled to an output of the multiplexer; and
a second switching circuit having a first input and an output, wherein the first input of the second switching circuit is coupled to the output of the demultiplexer, and wherein the output of the second switching circuit is coupled to the register.

2. The data circuit of claim 1, wherein the switch control input of the first switching circuit is adapted to be coupled to a shift direction operand.

3. The data circuit of claim 1, wherein the second switching circuit further includes a second input, and the second input of the second switching circuit is adapted to be coupled to a shift direction operand.

4. The data circuit of claim 1, wherein the register is a step register.

5. The data circuit of claim 1, wherein the register is an address register.

6. The data circuit of claim 1, wherein the multiplexer has an output coupled to a shifted data output register.

7. The data circuit of claim 1, wherein:
the register is a first register;
the data circuit includes a second register; and
the first switching circuit has a second input coupled to the second register.

8. The data circuit of claim 7, wherein the multiplexer is configured to selectively shift data from the first register in a first direction and to selectively shift data from the second register in a second direction, the second direction opposite the first direction.

9. The data circuit of claim 7, further comprising:
a third register; and
a fourth register;
wherein the first switching circuit has a third input coupled to the third register and the first switching circuit has a fourth input coupled to the fourth register.

10. The data circuit of claim 9, wherein:
the multiplexer is a first multiplexer; and
the data circuit includes a second multiplexer coupled to:
a second output of the first switching circuit, the first output of the first switching circuit, and an input of the first multiplexer.

11. The data circuit of claim 7, wherein:
the output of the second switching circuit is a first output coupled to the input of the first register; and
the second switching circuit has a second output coupled to the second register.

12. The data circuit of claim 11, wherein the second switching circuit includes a switch configured to selectively switch between the first output of the second switching circuit and the second output of the second switching circuit.

13. The data circuit of claim 11, further comprising:
a third register; and
a fourth register;
wherein the second switching circuit comprises a third output coupled to the third register and a fourth output coupled to the fourth register.

14. The data circuit of claim 13, wherein:
the second switching circuit includes:
a first switch configured to selectively switch between the first output of the second switching circuit and the second output of the second switching circuit; and
a second switch configured to selectively switch between the third output of the second switching circuit and the fourth output of the second switching circuit.

15. The data circuit of claim 1, wherein the instruction operand is received from an instruction.

\* \* \* \* \*